United States Patent [19]

Lowenhaupt et al.

[11] Patent Number: 4,541,994

[45] Date of Patent: * Sep. 17, 1985

[54] METHOD OF LIBERATING NICKEL- AND COBALT-ENRICHED FINES FROM LATERITE

[75] Inventors: E. Harris Lowenhaupt, Gasquet, Calif.; John E. Litz, Lakewood; Dennis L. Howe, Broomfield, both of Colo.

[73] Assignee: California Nickel Corporation, Crescent City, Calif.

[ * ] Notice: The portion of the term of this patent subsequent to Sep. 17, 2002 has been disclaimed.

[21] Appl. No.: 516,237

[22] Filed: Jul. 22, 1983

[51] Int. Cl.$^4$ ............ C01G 53/00; C01G 55/00; C22B 3/00

[52] U.S. Cl. ............ 423/150; 423/123; 423/128; 423/131; 423/141; 423/146; 423/159; 423/161; 423/166; 75/101 R; 75/108; 75/115; 75/119; 75/121

[58] Field of Search ............ 423/123, 128, 140, 131, 423/141, 146, 159, 150, 161, 155, 166; 75/101 R, 108, 115, 121, 119

[56] References Cited

U.S. PATENT DOCUMENTS

| | | |
|---|---|---|
| 2,842,427 | 7/1958 | Reynaud et al. ............ 23/183 |
| 2,872,306 | 2/1959 | Morrow ............ 75/101 |
| 2,971,836 | 2/1961 | Hall ............ 75/119 |
| 3,093,559 | 6/1963 | White ............ 204/123 |
| 3,293,027 | 12/1966 | Mackiw et al. ............ 75/119 |
| 3,333,924 | 8/1967 | Hazen et al. ............ 23/165 |
| 3,365,341 | 1/1968 | Fitzhugh, Jr. et al. ............ 75/119 |
| 3,466,144 | 9/1969 | Kay ............ 23/183 |
| 3,473,920 | 10/1969 | Fitzhugh, Jr. et al. ............ 75/109 |
| 3,720,749 | 3/1973 | Taylor et al. ............ 423/141 |
| 3,737,307 | 6/1973 | Fitzhugh, Jr. et al. ............ 75/109 |
| 3,773,891 | 11/1973 | O'Neill ............ 423/139 |
| 3,793,430 | 2/1974 | Weston ............ 423/36 |
| 3,793,432 | 2/1974 | Weston ............ 423/143 |
| 3,804,613 | 4/1974 | Zundel et al. ............ 75/101 R |
| 3,809,549 | 5/1974 | Opratko ............ 75/101 R |
| 3,991,159 | 11/1976 | Queneau et al. ............ 423/150 |
| 4,012,484 | 3/1977 | Lussiez ............ 423/53 |
| 4,044,096 | 8/1977 | Queneau et al. ............ 423/150 |
| 4,065,542 | 12/1977 | Subramanian et al. ............ 423/35 |
| 4,097,575 | 6/1978 | Chou et al. ............ 423/150 |
| 4,098,870 | 7/1978 | Fekete et al. ............ 423/123 |
| 4,195,065 | 3/1980 | Duyvesteyn ............ 423/150 |
| 4,410,498 | 10/1983 | Hatch et al. ............ 423/150 |

OTHER PUBLICATIONS

"Freeport Nickel's Moa Bay Puts Cuba Among Ranking Ni-Producing Nations", Engineering and Mining Journal, vol. 160, No. 12, Dec. 1959, pp. 84-92.

Primary Examiner—John Doll
Assistant Examiner—Robert L. Stoll
Attorney, Agent, or Firm—Sheridan, Ross & McIntosh

[57] ABSTRACT

According to the present invention, Ni- and Co-rich, low Mg fines may be advantageously separated from the coarse fractions of lateritic ores by atmospheric or low pressure leaching. In particular, the process of the present invention comprises contacting a lateritic ore or ore fraction at temperatures from about 20° C. to about 200° C. and pressures from about atmospheric to about 200 psig with an aqueous acid solution to form a leach liquor, a leach residue and a fines fraction. The fines fraction which can be separated from the residue with the leach liquor by conventional means such as cycloning is found to be richer in Ni and Co and lower than the remainder of the residue.

11 Claims, No Drawings

METHOD OF LIBERATING NICKEL- AND COBALT-ENRICHED FINES FROM LATERITE

FIELD OF INVENTION

This invention relates to methods of recovering nickel and cobalt from lateritic ores and, in particular, to a method of separating nickel and cobalt-rich fines from the coarse fractions of the ore prior to recovery of the desired metal values.

BRIEF DESCRIPTION OF THE PRIOR ART

A wide variety of processes are known for the recovery of nickel and/or cobalt from various nickel-bearing ores including laterite and serpentine ores. Basic to one type of recovery processing is the solubilizing of the nickel and/or cobalt by sulfuric acid leaching followed by neutralization. In general, it is known that process economics are advantageously altered by minimizing the amount of acid consumption during leaching by non-essential alkaline elements of the ore such as magnesium. In addition, advantages are known to be achieved through the use of acid-consuming ore fractions as part or all of the neutralizing agent utilized subsequent to the acid leach step.

The acid-consuming ore fractions are generally the coarser particles of greater than about 100 mesh. These particles are high in acid-consuming magnesium, and are often lower in nickel and cobalt than the finer portion of the ore. In the prior art practice, these coarser particles are often separated from the ore feed by for example a cyclone.

The fine fraction, smaller than about 100 mesh, which is lowest in magnesium, is sent to high pressure sulfuric acid leach, where the nickel and cobalt are extracted at high recoveries, typically in excess of 90% of each metal. In order to achieve this high yield, sufficient $H_2SO_4$ must be added to leave a residual concentration of acid in the product liquor from the high pressure leach.

This acid is known to be neutralized by contacting it with the high acid consuming coarser fractions in a secondary downstream lower temperature leach, where some of the magnesium, nickel, and cobalt in these coarse fractions are leached while the acid is neutralized. Because relatively low extractions of Ni and Co are obtained in the secondary leach, the residue containing unrecovered Ni and Co is then sent to the primary high pressure leach along with the minus 100 mesh fines fraction from the original ore separation.

In the primary high pressure leach, the unrecovered Ni and Co from the secondary leach residue are extracted at high yield, but with the detrimental effect of also extracting much of the residual magnesium. This represents an unwanted consumption of $H_2SO_4$, which in some cases makes the process uneconomical.

Thus it would be advantageous to eliminate some of the magnesium in the coarse fractions before sending them to high pressure leach, without also eliminating unacceptable amounts of the Ni and Co. This would be possible if a new fraction which is relatively high in Ni and Co, and relatively low in Mg could be liberated from the coarse fractions.

Liberation of such a fraction has proved impossible in prior art practice. All known beneficiation techniques, including flotation, gravity separation, magnetic separation, selective flocculation, classification, and the like have been tried. No significant liberation of a Ni and Co enriched fraction has been obtained, with or without grinding.

It has now been discovered that the secondary leach at low or atmospheric pressure liberates a Ni- and Co-enriched fine fraction which is lower in Mg. If the leach residue is separated, e.g. by cycloning, the overflow stream containing the liberated enriched fine fraction can be sent to high pressure leach, while the underflow fraction which is high in Mg and low in Ni and Co can be discarded.

By discarding the high Mg underflow, sulfuric acid consumption in the high pressure leach can be reduced, with resulting savings in capital and operating costs of producing the acid. Because of the unexpected discovery of a method of liberating enriched fines, undue loss of Ni and Co with the discarded residue is avoided if the fines are separated and sent to high pressure leach.

SUMMARY OF THE INVENTION

According to the present invention, Ni- and Co-rich low Mg fines may be advantageously separated from the coarse fractions of lateritic ores by atmospheric or low pressure leaching. In particular, the process of the present invention comprises contacting a lateritic ore or ore fraction at temperatures from about 20° C. to about 200° C. and pressures from about atmospheric to about 200 psig with an aqueous acid solution to form a leach liquor, a leach residue and a fines fraction. The fines fraction which can be separated from the residue with the leach liquor by conventional means such as cycloning is found to be richer in Ni and Co and lower in Mg than the remainder of the residue.

DETAILED DESCRIPTION OF A PREFERRED EMBODIMENT

The present invention provides a method for liberating and separating Ni- and Co-rich fines from the coarse fractions of a laterite ore. In particular, the process provides for leaching the ore fractions at ambient or low temperature and thereafter separating the Ni- and Co-rich fines liberated by such leaching along with the leach liquor.

As described hereinbefore, there are a number of processes wherein nickel and cobalt may be recovered from lateritic ores by a sequence of steps including at least one sulfuric acid leach whereby the nickel and cobalt are solubilized into the pregnant leach liquor and recovered therefrom by conventional means. Typical of such processes are those described in U.S. Pat. Nos. 4,044,096, 4,195,065 and 3,466,144 the details of which are incorporated herein by reference.

The process of the present invention wherein the ore fractions to be subsequently processed is first leached to liberate low-magnesium fines may advantageously be used in conjunction with any such processes. By liberating the Ni and Co-rich low-Mg fines according to the present invention, the ore subsequently processed has a higher proportion of nickel and cobalt relative to magnesium resulting in a lower consumption of acid. In addition, since nickel and cobalt recovery processes using sulfuric acid leaching require that the acid subsequently be neutralized, this acid can be used to liberate fines while it is being neutralized.

In one method of leaching lateritic or limonitic nickel ore using sulfuric acid as the leach reagent the ore is cumminuted to a suitable degree of fineness by grinding, crushing, classifying and the like, to from about −48 mesh, most preferably −28 mesh to about 90% less than 325 mesh and formed into an aqueous slurry or pulp of suitable consistency, typically from about 20 to about 50 weight percent solids and more preferably from about 40 to about 45 weight percent solids.

The slurried ore is then typically preheated to a leaching temperature of between about 200° C. and about 300° C., directly or indirectly as by injection of live steam. The preheated slurry is then typically fed to an autoclave or other reactor suitable for acid leaching with $H_2SO_4$.

In the practice of the present invention the ore or slurry, before or in lieu of preheating, is pre-leached by contact with sulfuric acid at ambient or low temperatures and pressures, i.e. a temperature of from about 20° C. to about 200° C. and a pressure below about 300 psig, to liberate the nickel- and cobalt-enriched, magnesium-depleted fines fraction. The amount of sulfuric acid required to liberate fines from coarse laterite ore is not critical, and will depend on the source of the ore, the amount of fines liberation desired, and the amount of attendant magnesium dissolution desired. As will be recognized by those skilled in the art, there will for any particular ore be a quantity of acid which will cause extensive fines liberation without undue dissolution of the low grade magnesium containing fraction. The pre-leach liquor along with the liberated fines, typically 90 percent less than about 100 mesh, frequently 90 percent less than 200 mesh in size, are separated from the remainder of the residue by conventional means such as cycloning.

The primary $H_2SO_4$ leach is typically at temperatures between 200° and 300° C. and pressures of about 400 to about 850 psig for a time sufficient to solubilize a substantial amount of the Ni and Co from the ore and form a slurry of Co- and Ni-containing pregnant liquor and leach residue. The slurry is then neutralized by the addition of MgO or other acid neutralizing agent. The liquor is separated from the neutralized residue and the metal values recovered therefrom by conventional means. Typically, the pregnant liquor is contacted with $H_2S$ to precipitate nickel sulfide. The remaining liquor is then separated from the precipitate and may advantageously be contacted with $H_2$ to reduce the cobalt present to its elemental state.

The following examples are provided by way of illustration and not by way of limitation.

EXAMPLES

A series of tests were conducted to assess the amount and distribution of nickel, cobalt and magnesium present in various mesh sizes of the solid residue remaining after leach tests generally conducted according to the process of the present invention. The size of the particles of the initial feed materials, the amount of each material used and temperatures and pressures employed varied among the tests. For purposes of the laboratory tests the feed materials were filtered and washed after treatment and the solids were separated by sizing into the various fractions for analysis of metal content.

Analysis of metal components was done by the atomic absorption method. The analysis of feed material used, initial size distribution of the solids and the specific parameters of the individual test conditions are given in the tables reporting each test series.

EXAMPLE 1

A laterite ore coarse fraction was leached in three separate tests with an acid-containing evaporate solution prepared by the evaporation of water from a solution recovered from a previous laterite ore fines fraction high temperature leach. The evaporate contained: 5.92 g/l Ni, 0.662 g/l Co, 37.7 g/l Mg, 19.79 b/l Fe, 5.1 g/l A and 20 g/l $H_2SO_4$. The amount of evaporate utilized varied in each of three tests, while the amount of the feed material remained constant. The low temperature/pressure leach was conducted at a pressure of 300 psi for 40 minutes at 180° C. followed by 20 minutes at 160° C. For Tests #1 and #3 bleed was 100 cc/min. For Test #2 bleed was 500 cc/min.

Particle sizes of the coarse fractions, analysis of the particle sizes within the feed, acid-content of the evaporate and metallurgical data for both feed and evaporate are given in Table 1.

Table 2 shows the results of secondary low pressure leach tests on this material, with the buildup of Ni- and Co-enriched, low-Mg fines in the −200 mesh fines fraction.

TABLE 1

Analysis of Feed Material for Low Pressure Leach Tests
Metallurgical Data

| Feed to Test 1-3 | | dist % | Ni % | Dist. % | Co % | Dist. % | Mg % | Dist. % |
|---|---|---|---|---|---|---|---|---|
| Solids | +20-mesh | 17.01 | 0.47 | 14.36 | 0.05 | 10.74 | 8.20 | 14.18 |
| #1478-75 | 20 × 48 | 16.22 | 0.50 | 14.72 | 0.06 | 12.80 | 9.02 | 14.87 |
| ¼ × | 48 × 100 | 21.33 | 0.50 | 19.31 | 0.07 | 20.48 | 11.20 | 24.28 |
| 325 mesh | 100 × 200 | 28.13 | 0.58 | 29.11 | 0.09 | 33.66 | 11.00 | 31.45 |
| | −200 | 17.31 | 0.72 | 22.50 | 0.10 | 22.31 | 8.65 | 15.22 |
| | Total | 100.00 | 0.56 | 100.00 | 0.08 | 100.00 | 9.84 | 100.00 |

Evaporate Volume:
Test #1 - 670 mls
Test #2 - 830 mls
Test #3 - 1000 mls

TABLE 2

Results of Low Pressure Leach Tests
Metallurgical Data

| | | Ni | Co | Mg | Fe | Al | $H_2SO_4$ |
|---|---|---|---|---|---|---|---|
| | | | Test #1 | | | | |
| Filtrate Volume | 465 mls | 6.17 g/l | .926 g/l | 60.4 g/l | .9 | 402 | 1.2 |
| Wash Volume | 1050 mls | 1.28 g/l | .193 g/l | 11.2 g/l | | | 0.22 |

TABLE 2-continued

Results of Low Pressure Leach Tests
Metallurgical Data

| Residue | Weight | dist % | Ni % | Dist. % | grams | Co % | Dist. % | grams | Mg % | Dist. % | grams | Fe | Al | H$_2$SO$_4$ |
|---|---|---|---|---|---|---|---|---|---|---|---|---|---|---|
| +20-mesh | 46.1 | 11.65 | .502 | 11.76 | 0.23 | .042 | 13.56 | 0.02 | 7.67 | 13.05 | 3.54 | | | |
| 20 × 48 | 52.6 | 13.30 | .351 | 9.39 | 0.18 | .029 | 10.68 | 0.02 | 9.35 | 18.15 | 4.92 | | | |
| 48 × 100 | 65.2 | 16.48 | .308 | 10.21 | 0.20 | .026 | 11.87 | 0.02 | 9.79 | 23.56 | 6.38 | | | |
| 100 × 200 | 71.6 | 18.10 | .363 | 13.21 | 0.26 | .029 | 14.54 | 0.02 | 8.04 | 21.25 | 5.76 | | | |
| −200 | 160.1 | 40.47 | .681 | 55.43 | 1.09 | .044 | 49.34 | 0.07 | 4.06 | 23.99 | 6.50 | | | |
| Total | 395.60 | 59.53 | 0.50 | 100.00 | 1.97 | 0.04 | 100.00 | 0.14 | 6.85 | 100.00 | 27.09 | | | |
| Dissolution, % | | | | 11.48 | | | 543.05 | | | 31.15 | | | | |
| Balance (out/in × 100) | | | | 99.86 | | | 103.79 | | | 103.60 | | | | |
| Acid Consumption (Includes acid produced by Fe and Al precipitation and excludes acid consumed by MgO addition) | | | | | | | | | | | | | | lb/ton 305 |

Test #2

| | | | | | | | | | | | | | | |
|---|---|---|---|---|---|---|---|---|---|---|---|---|---|---|
| Filtrate Volume | 640 mls | | | 7.01 g/l | | | .977 g/l | | | 67.9 g/l | | 1.64 | 1.34 | 5.4 |
| Wash Volume | 1000 mls | | | 1.03 g/l | | | .015 g/l | | | 9.57 g/l | | | | 0.76 |

| Residue | Weight | dist % | Ni % | Dist. % | grams | Co % | Dist. % | grams | Mg % | Dist. % | grams |
|---|---|---|---|---|---|---|---|---|---|---|---|
| +20-mesh | 50.9 | 12.95 | .423 | 16.22 | 0.22 | .037 | 19.35 | 0.02 | 7.19 | 12.35 | 3.66 |
| 20 × 48 | 42.5 | 10.81 | .288 | 9.22 | 0.12 | .025 | 10.92 | 0.01 | 8.70 | 12.48 | 3.70 |
| 48 × 100 | 52.9 | 13.46 | .206 | 8.21 | 0.11 | .018 | 9.78 | 0.01 | 9.56 | 17.07 | 5.06 |
| 100 × 200 | 66.8 | 16.99 | .281 | 14.14 | 0.19 | .020 | 13.73 | 0.01 | 8.06 | 18.17 | 5.38 |
| −200 | 180 | 45.79 | .385 | 52.21 | 0.69 | .025 | 46.23 | 0.05 | 6.57 | 39.92 | 11.83 |
| Total | 393.10 | 54.21 | .338 | 100.00 | 1.33 | .025 | 100.00 | 0.10 | 7.54 | 100.00 | 29.62 |
| Dissolution, % | | | | 40.27 | | | 67.99 | | | 24.72 | | | | |
| Balance (out/in × 100) | | | | 95.91 | | | 86.42 | | | 117.00 | | | | |
| Acid Consumption (includes acid produced by Fe and Al precipitation) | | | | | | | | | | | | | | lb/ton 399 |

Test #3

| Filtrate Volume | 815 mls | | | 6.25 g/l | | | .874 g/l | | | 53.4 g/l | | 1.78 | 1.91 | 7.2 |
|---|---|---|---|---|---|---|---|---|---|---|---|---|---|---|
| Wash Volume | 990 mls | | | 1.05 g/l | | | .156 g/l | | | 9.02 g/l | | 1.22 | | |

| Residue | Weight | dist % | Ni % | Dist. % | grams | Co % | Dist. % | grams | Mg % | Dist. % | grams |
|---|---|---|---|---|---|---|---|---|---|---|---|
| +20-mesh | 45.6 | 11.49 | .423 | 12.03 | 0.19 | .037 | 14.41 | 0.02 | 7.18 | 13.57 | 3.27 |
| 20 × 48 | 40.8 | 10.28 | .292 | 7.43 | 0.12 | 0.25 | 8.71 | 0.01 | 8.17 | 13.81 | 3.33 |
| 48 × 100 | 59.7 | 15.04 | .194 | 7.22 | 0.12 | .019 | 9.69 | 0.01 | 9.6 | 23.75 | 5.73 |
| 100 × 200 | 74.0 | 18.64 | .3 | 13.85 | 0.22 | .025 | 15.80 | 0.02 | 7.79 | 23.88 | 5.76 |
| −200 | 176.9 | 44.56 | .539 | 59.47 | 0.95 | .034 | 51.38 | 0.06 | 3.41 | 24.99 | 6.03 |
| Total | 397.00 | 55.44 | 0.40 | 100.00 | 1.60 | 0.03 | 100.00 | 0.12 | 6.08 | 100.00 | 24.14 |
| Dissolution, % | | | | 27.85 | | | 61.51 | | | 38.67 | | | | |
| Balance (out/in × 100) | | | | 95.02 | | | 101.83 | | | 99.39 | | | | |
| Acid Consumption (Includes acid produced by Fe and Al precipitation and excludes acid consumed by MgO addition) | | | | | | | | | | | | | | lb/ton 382 |

EXAMPLE 2

The sands from +325 mesh laterite ore feed containing 0.42%; Ni, 0.05% Co and 8.72% Mg were leached with evaporate containing 6.11 g/l Ni, 0.65 g/l Co, 38.1 g/l Mg, 20 g/l Fe and 5.43 g/l Al for 8 hours at atmospheric pressure and a temperature of 60° C. Three separate tests (Nos. 4–6) wherein the percent of solids of the feed material varied from 5% to 15% were conducted. The particle size distribution of the solid feed material, volume and acid content of the evaporate and metallurgical data for each of the tests are reported in Tables 3, 4 and 5. Once again, the build-up of Ni- and Co-enriched, low Mg fines is shown in the −200 mesh fines fraction.

TABLE 3

Analysis of Feed and Results of Atmospheric Pressure Leach
Metallurgical Data - 5% solids Test #4

| | | Weight | dist % | Ni % | Dist. % | grams | Co % | Dist. % | grams | Mg % | Dist. % | grams | Fe g/l | Al g/l | H$_2$SO$_4$ g/l |
|---|---|---|---|---|---|---|---|---|---|---|---|---|---|---|---|
| Feed | +20-mesh | 66.57 | 44.38 | 0.483 | 50.96 | 0.32 | .050 | 44.39 | 0.03 | 8.34 | 42.45 | 5.55 | | | |
| Solids | 20 × 48 | 47.77 | 31.85 | 0.403 | 30.51 | 0.19 | .051 | 32.42 | 0.02 | 8.44 | 30.82 | 4.03 | | | |
| | 48 × 100 | 22.11 | 14.74 | 0.285 | 9.99 | 0.06 | .042 | 12.38 | 0.01 | 10.50 | 17.75 | 2.32 | | | |
| | 100 × 200 | 8.04 | 5.36 | 0.288 | 3.67 | 0.02 | .048 | 5.15 | 0.00 | 9.96 | 6.13 | 0.80 | | | |
| | −200 | 5.51 | 3.67 | 0.558 | 4.87 | 0.03 | .077 | 5.66 | 0.00 | 6.78 | 2.86 | 0.37 | | | |
| | Total | 150 | 100.00 | 0.421 | 100.00 | 0.63 | .050 | 100.00 | 0.07 | 8.72 | 100.00 | 13.08 | | | |
| Evaporate Volume | | 3000 mls | | | 6.11 g/l | | | .65 g/l | | | 38.1 g/l | | 20 | 5.43 | 36 |
| Filtrate Volume | | 3000 mls | | | 5.89 g/l | | | .66 g/l | | | 38.6 g/l | | 20.9 | 5.43 | 14.71 |
| Wash Volume | | 600 mls | | | .17 g/l | | | .018 g/l | | | 1.2 g/l | | | | 0.46 |

| Residue | Weight | dist % | Ni % | Dist. % | grams | Co % | Dist. % | grams | Mg % | Dist. % | grams |
|---|---|---|---|---|---|---|---|---|---|---|---|
| +20-mesh | 37.8 | 32.50 | 0.434 | 46.52 | 0.16 | .032 | 37.03 | 0.01 | 4.82 | 25.79 | 1.82 |
| 20 × 48 | 35.4 | 30.44 | 0.217 | 21.78 | 0.08 | .022 | 23.84 | 0.01 | 6.66 | 33.37 | 2.36 |
| 48 × 100 | 22.5 | 19.35 | 0.150 | 9.57 | 0.03 | .022 | 15.15 | 0.00 | 8.19 | 26.09 | 1.84 |
| 100 × 200 | 11.4 | 9.80 | 0.285 | 9.21 | 0.03 | .034 | 11.87 | 0.00 | 6.34 | 10.23 | 0.72 |

TABLE 3-continued

Analysis of Feed and Results of Atmospheric Pressure Leach
Metallurgical Data - 5% solids

| | | | | Ni | | | Co | | | Mg | | Fe | Al | $H_2SO_4$ |
|---|---|---|---|---|---|---|---|---|---|---|---|---|---|---|
| −200 | 9.2 | 7.91 | 0.495 | 12.91 | 0.05 | .043 | 12.11 | 0.00 | 3.47 | 4.52 | 0.32 | | | |
| Total | 116.30 | 92.09 | 0.303 | 100.00 | 0.35 | .028 | 100.00 | 0.03 | 6.07 | 100.00 | 7.06 | | | |
| Dissolution, % | | | | 44.11 | | | 56.44 | | | 45.99 | | | | |
| Balance (out/in × 100) | | | | 95.59 | | | 99.92 | | | 97.02 | | | | |
| Acid Consumption | | | | | | | | | | | | | | lb/ton 848 |

TABLE 4

Analysis of Feed and Results of Atmospheric Pressure Leach
Metallurgical Data - 10% solids

| | | | | | Ni | | | Co | | | Mg | | Fe | Al | $H_2SO_4$ |
|---|---|---|---|---|---|---|---|---|---|---|---|---|---|---|---|
| | | | | | | Test #5 | | | | | | | | | |
| | | Weight | dist % | Dist. % | grams | % | Dist. % | grams | % | Dist. % | grams | g/l | g/l | g/l |
| Feed | +20-mesh | 133.15 | 44.38 | 0.483 | 50.96 | 0.64 | .050 | 44.39 | 0.07 | 8.34 | 42.45 | 11.10 | | | |
| Solids | 20 × 48 | 95.54 | 31.85 | 0.403 | 30.51 | 0.39 | .051 | 32.42 | 0.05 | 8.44 | 30.82 | 8.06 | | | |
| | 48 × 100 | 44.21 | 14.74 | 0.285 | 9.99 | 0.13 | .042 | 12.38 | 0.02 | 10.50 | 17.75 | 4.64 | | | |
| | 100 × 200 | 16.09 | 5.36 | 0.288 | 3.67 | 0.05 | .048 | 5.15 | 0.01 | 9.96 | 6.13 | 1.60 | | | |
| | −200 | 11.02 | 3.67 | 0.558 | 4.87 | 0.06 | .077 | 5.66 | 0.01 | 6.78 | 2.86 | 0.75 | | | |
| | Total | 300 | 100.00 | 0.421 | 100.00 | 1.26 | .050 | 100.00 | 0.15 | 8.72 | 100.00 | 26.16 | | | |
| Evaporate Volume | | 3000 mls | | | 6.11 g/l | | | .65 g/l | | | 38.1 g/l | | 20 | 5.43 | 36 |
| Filtrate Volume | | 3000 mls | | | 5.96 g/l | | | .66 g/l | | | 39.4 g/l | | 23.2 | 5.45 | 11.7 |
| Wash Volume | | 600 mls | | | .39 g/l | | | .043 g/l | | | 2.7 g/l | | | | 0.80 |

| Residue | | Weight | dist % | Dist. % | grams | % | Dist. % | grams | % | Dist. % | grams | | | |
|---|---|---|---|---|---|---|---|---|---|---|---|---|---|---|
| | +20-mesh | 90.1 | 37.26 | 0.431 | 47.92 | 0.39 | .035 | 42.58 | 0.03 | 5.86 | 35.08 | 5.28 | | | |
| | 20 × 48 | 72.2 | 29.86 | 0.225 | 20.05 | 0.16 | .025 | 24.37 | 0.02 | 6.78 | 32.52 | 4.90 | | | |
| | 48 × 100 | 34.3 | 14.19 | 0.144 | 6.09 | 0.05 | .019 | 8.80 | 0.01 | 8.41 | 19.16 | 2.88 | | | |
| | 100 × 200 | 11.9 | 4.92 | 0.166 | 2.44 | 0.02 | .025 | 4.02 | 0.00 | 7.79 | 6.16 | 0.93 | | | |
| | −200 | 33.3 | 13.77 | 0.572 | 23.50 | 0.19 | .045 | 20.23 | 0.01 | 3.2 | 7.08 | 1.07 | | | |
| | Total | 241.80 | 86.23 | 0.335 | 100.00 | 0.81 | .031 | 100.00 | 0.07 | 6.23 | 100.00 | 15.05 | | | |
| Dissolution, % | | | | | 35.78 | | | 50.62 | | | 42.46 | | | | |
| Balance (out/in × 100) | | | | | 96.59 | | | 99.04 | | | 96.02 | | | | |
| Acid Consumption | | | | | | | | | | | | | | | lb/ton 483 |

TABLE 5

Analysis of Feed and Results of Atmospheric Pressure Leach
Metallurgical Data - 15% solids

| | | | | | Ni | | | Co | | | Mg | | Fe | Al | $H_2SO_4$ |
|---|---|---|---|---|---|---|---|---|---|---|---|---|---|---|---|
| | | | | | | Test #6 | | | | | | | | | |
| | | Weight | dist % | Dist. % | grams | % | Dist. % | grams | % | Dist. % | grams | g/l | g/l | g/l |
| Feed | +20-mesh | 99.86 | 44.38 | 0.483 | 50.96 | 0.48 | .050 | 44.39 | 0.05 | 8.34 | 42.45 | 8.33 | | | |
| | 20 × 48 | 71.65 | 31.85 | 0.403 | 30.51 | 0.29 | .051 | 32.42 | 0.04 | 8.44 | 30.82 | 6.05 | | | |
| | 48 × 100 | 33.16 | 14.74 | 0.285 | 9.99 | 0.09 | .042 | 12.38 | 0.01 | 10.50 | 17.75 | 3.48 | | | |
| | 100 × 200 | 12.07 | 5.36 | 0.288 | 3.67 | 0.03 | .048 | 5.15 | 0.01 | 9.96 | 6.13 | 1.20 | | | |
| | −200 | 8.26 | 3.67 | 0.558 | 4.87 | 0.05 | .077 | 5.66 | 0.01 | 6.78 | 2.86 | 0.56 | | | |
| | Total | 225 | 100.00 | 0.421 | 100.00 | 0.95 | .050 | 100.00 | 0.11 | 8.72 | 100.00 | 19.62 | | | |
| Evaporate Volume | | 1500 mls | | | 6.11 g/l | | | .65 g/l | | | 38.1 g/l | | 20 | 5.43 | 36 |
| Filtrate Volume | | 1450 mls | | | 6.09 g/l | | | .67 g/l | | | 40.7 g/l | | 21.6 | 5.6 | 10.3 |
| Wash Volume | | 600 mls | | | .29 g/l | | | .031 g/l | | | 2.02 g/l | | | | 0.51 |

| Residue | | Weight | dist % | Dist. % | grams | % | Dist. % | grams | % | Dist. % | grams | | | |
|---|---|---|---|---|---|---|---|---|---|---|---|---|---|---|
| | +20-mesh | 69.30 | 39.99 | 0.362 | 46.66 | 0.25 | .033 | 45.44 | 0.02 | 6.04 | 35.19 | 4.19 | | | |
| | 20 × 48 | 50.80 | 29.31 | 0.251 | 23.71 | 0.13 | .024 | 24.23 | 0.01 | 7.60 | 32.46 | 3.86 | | | |
| | 48 × 100 | 23.70 | 13.68 | 0.162 | 7.14 | 0.04 | .020 | 9.42 | 0.00 | 9.74 | 19.41 | 2.31 | | | |
| | 100 × 200 | 7.50 | 4.33 | 0.222 | 3.10 | 0.02 | .023 | 3.43 | 0.00 | 8.8 | 5.55 | 0.66 | | | |
| | −200 | 22.00 | 12.69 | 0.474 | 19.39 | 0.10 | .040 | 17.49 | 0.01 | 4.0 | 7.40 | 0.88 | | | |
| | Total | 173.30 | 87.31 | 0.310 | 100.00 | 0.54 | .029 | 100.00 | 0.05 | 6.86 | 100.00 | 11.89 | | | |
| Dissolution, % | | | | | 43.19 | | | 55.26 | | | 39.37 | | | | |
| Balance (out/in × 100) | | | | | 94.37 | | | 95.67 | | | 93.95 | | | | |
| Acid Consumption | | | | | | | | | | | | | | | lb/ton 345 |

EXAMPLE 3

Classifier sands stage laterite ore was ground to pass through a 20 mesh screen and was then further screened and separated into smaller particle sizes. An analysis of the relevant metallic components of the ore according to particle sizes is given in Table 6.

TABLE 6

Classifer Sands Stage Laterite Ore Ground to Pass 20-Mesh
Screen Analysis and Distribution of Values

| Size Mesh | Weight % | % Retain | % Pass | % Ni | Nickel Distr % | % Pass | % Co | Cobalt Distr % | % Pass | % Fe | Iron % | % Pass | % Mg | Magnesium Distr % | % Pass |
|---|---|---|---|---|---|---|---|---|---|---|---|---|---|---|---|
| 35 | 36.56 | 36.56 | 63.44 | 0.432 | 33.88 | 66.12 | 0.044 | 32.81 | 67.19 | 27.7 | 37.58 | 62.42 | 8.97 | 34.31 | 65.69 |
| 48 | 16.80 | 53.36 | 46.64 | 0.432 | 15.57 | 50.56 | 0.044 | 15.08 | 52.11 | 27.7 | 17.27 | 45.15 | 8.97 | 15.77 | 49.93 |
| 65 | 12.98 | 66.33 | 33.67 | 0.402 | 11.19 | 39.37 | 0.043 | 11.38 | 40.73 | 22.9 | 11.03 | 34.12 | 11.1 | 15.07 | 34.86 |
| 100 | 8.41 | 74.74 | 25.26 | 0.402 | 7.25 | 32.12 | 0.043 | 7.38 | 33.35 | 22.9 | 7.15 | 26.98 | 11.1 | 9.76 | 25.09 |
| 150 | 5.50 | 80.24 | 19.76 | 0.447 | 5.28 | 26.84 | 0.048 | 5.39 | 27.97 | 23.9 | 4.88 | 22.10 | 10.8 | 6.22 | 18.88 |
| 200 | 2.15 | 82.39 | 17.61 | 0.447 | 2.06 | 24.78 | 0.048 | 2.10 | 25.87 | 23.9 | 1.90 | 20.20 | 10.8 | 2.42 | 16.45 |
| −200 | 17.61 | 100.00 | 0.00 | 0.656 | 24.78 | 0.00 | 0.072 | 25.87 | 0.00 | 30.9 | 20.20 | 0.00 | 8.93 | 16.45 | 0.00 |
| Calculated Head | | | | 0.47 | | | 0.049 | | | 26.9 | | | 9.56 | | |

| Size Mesh | Weight % | % Retain | % Pass | % Mn | Manganese Distr % | % Pass | % Cr | Chromium Distr % | % Pass | % Al | Aluminum Distr % | % Pass |
|---|---|---|---|---|---|---|---|---|---|---|---|---|
| 35 | 36.56 | 36.56 | 63.44 | 0.329 | 36.72 | 63.28 | 1.96 | 28.59 | 71.41 | 3.25 | 37.21 | 62.79 |
| 48 | 16.80 | 53.36 | 46.64 | 0.329 | 16.87 | 46.41 | 1.96 | 13.14 | 58.28 | 3.25 | 17.10 | 45.69 |
| 65 | 12.98 | 66.33 | 33.67 | 0.272 | 10.78 | 35.63 | 4.02 | 20.81 | 37.46 | 3.08 | 12.52 | 33.18 |
| 100 | 8.41 | 74.74 | 25.26 | 0.272 | 6.98 | 28.65 | 4.02 | 13.49 | 23.98 | 3.08 | 8.11 | 25.06 |
| 150 | 5.50 | 80.24 | 19.76 | 0.292 | 4.90 | 23.74 | 4.22 | 9.26 | 14.71 | 3.28 | 5.65 | 19.41 |
| 200 | 2.15 | 82.39 | 17.61 | 0.292 | 1.91 | 21.83 | 4.22 | 3.61 | 11.10 | 3.28 | 2.20 | 17.21 |
| −200 | 17.61 | 100.00 | 0.00 | 0.406 | 21.83 | 0.00 | 1.58 | 11.10 | 0.00 | 3.12 | 17.21 | 0.00 |
| Calculated Head | | | | 0.33 | | | 2.51 | | | 3.19 | | |

EXAMPLE 4

Four samples of the −20 mesh ore fraction of Example 3 were leached at atmospheric pressure for 2 hours at a temperature of 80° C. with a high pressure leach evaporate containing 22.7 g/l Fe, 4.99 g/l Al, 35 g/l $H_2SO_4$, 5.82 g/l Ni, 0.674 g/l Co, and 41.9 g/l Mg. For each of Test Nos. 7, 8, 9 and 10 the solids were 9.1, 7.7, 6.3 and 4.8% by weight.

The residue of these atmospheric leaches were analyzed for metallic content after the leach and demonstrate that Mg was rejected in the +200 mesh fraction, whereas Ni and Co were concentrated in the −200 mesh fractions. Results of the screen analysis are given in Table 7.

TABLE 7
Distribution of Values in Leached Residue

| Test No. | 7 | | 8 | |
|---|---|---|---|---|
| Screen Size | +200 | −200 | +200 | −200 |
| Weight, % | 76.4 | | 77.1 | |
| Nickel, % | 0.26 | 0.43 | 0.30 | 0.43 |
| Distr, % | 66.1 | | 68.2 | |
| Cobalt, % | 0.021 | 0.033 | 0.024 | 0.034 |
| Distr, % | 68.4 | | 66.7 | |
| Iron, % | 23.2 | 30.4 | 26.3 | 30.9 |
| Distr, % | 71.2 | | 74.1 | |
| Magnesium, % | 9.09 | 6.59 | 8.95 | 6.53 |
| Distr, % | 81.7 | | 82.1 | |
| Manganese, % | 0.15 | 0.16 | 0.16 | 0.17 |
| Distr, % | 75.0 | | 77.3 | |
| Chromium, % | 3.02 | 1.71 | 3.04 | 1.59 |
| Distr, % | 85.2 | | 86.4 | |
| Aluminum, % | 3.54 | 3.56 | 3.53 | 3.54 |
| Distr, % | 76.3 | | 77.0 | |

| Test No. | 9 | | 10 | |
|---|---|---|---|---|
| Screen Size | +200 | −200 | +200 | −200 |
| Weight, % | 77.9 | | 78.8 | |
| Nickel, % | 0.28 | 0.43 | 0.29 | 0.43 |
| Distr, % | 69.7 | | 70.8 | |
| Cobalt, % | 0.023 | 0.036 | 0.023 | 0.034 |
| Distr, % | 66.7 | | 72.5 | |

TABLE 7-continued
Distribution of Values in Leached Residue

| Iron, % | 25.1 | 31.4 | 25.1 | 30.8 |
|---|---|---|---|---|
| Distr, % | 73.8 | | 75.2 | |
| Magnesium, % | 8.94 | 6.27 | 8.63 | 6.00 |
| Distr, % | 83.4 | | 84.3 | |
| Manganese, % | 0.16 | 0.18 | 0.16 | 0.17 |
| Distr, % | 76.5 | | 76.9 | |
| Chromium, % | 2.97 | 1.57 | 2.80 | 1.65 |
| Distr, % | 87.1 | | 86.3 | |
| Aluminum, % | 3.52 | 3.54 | 3.37 | 3.37 |
| Distr, % | 78.0 | | 78.9 | |

EXAMPLE 5

Two different solid feed materials, one having a particle size of +325, the other the −200 mesh residue of an atmospheric leach were leached with an acid containing evaporate in a low pressure two-temperature leach. For each of the three separate tests, the characteristics of the test materials and the test conditions were as follows:

| Solids: | +325 Classifier Overflow | | |
|---|---|---|---|
| | 0.63% Ni | 0.09% Co | 10.31% Mg |
| | −200 mesh Atmospheric Leach Residue | | |
| | 0.53% Ni | 0.04% Co | 4.69% Mg |
| | 32.00% Fe | 3.41% Al | |
| Evaporate: | Atmospheric Leach Filtrate | | |
| | 5.92 g/l Ni | .71 g/l Co | 45.9 g/l Mg |
| | 21.3 g/l Fe | 4.97 g/l Al | |
| Test Conditions: | Time one 40 min | Temperature one 180° C. |
| | Time two 20 min | Temperature two 160° C. |
| Pressure: | 300 psig | Bleed 500 cc/min |

The amount of each solid material varied in the three tests while the amount of evaporate remained constant at 1000 mls. An analysis of the metallurgical data for the feed, the residue and the evaporate or leach filtrate before low pressure leaching and results after the leaching are shown in Tables 8, 9 and 10.

TABLE 8

Low Pressure Leach of Fine Particle Feed
Metallurgical Data

| | | Weight | dist % | % | Ni Dist. % | grams | % | Co Dist. % | grams | % | Mg Dist. % | grams | Fe g/l | Al g/l | $H_2SO_4$ g/l |
|---|---|---|---|---|---|---|---|---|---|---|---|---|---|---|---|
| Feed | +65-mesh | 84.50 | 16.9 | 0.619 | 16.51 | 0.523 | 0.083 | 15.36 | 0.070 | 10.90 | 17.86 | 9.21 | | | |
| Solids | 65 × 150 | 212.00 | 42.4 | 0.597 | 39.94 | 1.266 | 0.090 | 41.79 | 0.191 | 11.00 | 45.23 | 23.32 | | | |
| +325 | 150 × 270 | 179.50 | 35.9 | 0.662 | 37.50 | 1.188 | 0.096 | 37.75 | 0.172 | 9.64 | 33.56 | 17.30 | | | |
| | −270 | 24.00 | 4.8 | 0.799 | 6.05 | 0.192 | 0.097 | 5.10 | 0.023 | 7.19 | 3.35 | 1.73 | | | |
| | Total | 500 | 100.00 | 0.634 | 100.00 | 3.169 | 0.091 | 100.00 | 0.457 | 10.31 | 100.00 | 51.56 | | | |
| Atmos. Residue Weight −200 | | 38.0 | | 0.53 | | 0.20 | 0.04 | | 0.02 | 4.69 | | 1.78 | | | |
| Evaporate Volume | | 1000 mls | | | 5.92 g/l | | | .71 g/l | | | 45.9 g/l | | 21.3 | 4.97 | 15 |
| Filtrate Volume | | 640 mls | | | 6.07 g/l | | | 1.15 g/l | | | 66.9 g/l | | 1.4 | .23 | .31 |
| Wash Volume | | 1060 mls | | | 1.89 g/l | | | .24 g/l | | | 17.2 g/l | | | | 0.08 |
| Residue | | Weight | dist % | % | Dist. % | grams | % | Dist. % | grams | % | Dist. % | grams | | | |
| | +65-mesh | 41.3 | 7.65 | 0.447 | 5.71 | 0.185 | 0.031 | 6.31 | 0.013 | 11.10 | 13.31 | 4.58 | | | |
| | 65 × 150 | 126.7 | 23.46 | 0.390 | 15.28 | 0.494 | 0.028 | 17.49 | 0.035 | 9.69 | 35.64 | 12.28 | | | |
| | 150 ×270 | 138.9 | 25.72 | 0.478 | 20.54 | 0.664 | 0.029 | 19.86 | 0.040 | 7.26 | 29.27 | 10.08 | | | |
| | −270 | 233.1 | 43.17 | 0.811 | 58.47 | 1.890 | 0.049 | 56.33 | 0.114 | 3.22 | 21.79 | 7.51 | | | |
| | Total | 540.00 | 100.00 | 0.599 | 100.00 | 3.233 | 0.038 | 100.00 | 0.203 | 6.38 | 100.00 | 34.45 | | | |
| Dissolution, % | | | | | 4.05 | | | 57.15 | | | 35.41 | | | | |
| Balance (out/in × 100) | | | | | 98.19 | | | 100.84 | | | 96.23 | | | | |
| Acid Consumption (Includes acid generated by Fe and Al precipitation) | | | | | | | | | | | | | | | lb/ton 336 |

TABLE 9

Low Pressure Leach of Fine Particle Feed
Metallurgical Data

| | | Weight | dist % | % | Ni Dist. % | grams | % | Co Dist. % | grams | % | Mg Dist. % | grams | Fe g/l | Al g/l | $H_2SO_4$ g/l |
|---|---|---|---|---|---|---|---|---|---|---|---|---|---|---|---|
| Feed | +65-mesh | 76.05 | 16.9 | 0.619 | 16.51 | 0.471 | 0.083 | 15.36 | 0.063 | 10.90 | 17.86 | 8.29 | | | |
| Solids | 65 × 150 | 190.80 | 42.4 | 0.597 | 39.94 | 1.139 | 0.090 | 41.79 | 0.172 | 11.00 | 45.23 | 20.99 | | | |
| +325 | 150 × 270 | 161.55 | 35.9 | 0.662 | 37.50 | 1.069 | 0.096 | 37.75 | 0.155 | 9.64 | 33.56 | 15.57 | | | |
| | −270 | 21.60 | 4.8 | 0.799 | 6.05 | 0.173 | 0.097 | 5.10 | 0.021 | 7.19 | 3.35 | 1.51 | | | |
| | Total | 450 | 100.00 | 0.634 | 100.00 | 2.852 | 0.091 | 100.00 | 0.411 | 10.31 | 100.00 | 46.40 | | | |
| Atmos. Residue −200 | Weight | 34.0 | | 0.53 | | 0.18 | 0.04 | | 0.01 | 4.69 | | 1.59 | | | |
| Evaporate Volume | | 1000 mls | | | 5.92 g/l | | | .71 g/l | | | 45.9 g/l | | 21.3 | 4.97 | 15 |
| Filtrate Volume | | 670 mls | | | 6.67 g/l | | | 1.15 g/l | | | 72 g/l | | .75 | .46 | 1.01 |
| Wash Volume | | 1070 mls | | | 1.64 g/l | | | .24 g/l | | | 14.2 g/l | | | | 0.20 |
| Residue | | Weight | dist % | % | Dist. % | grams | % | Dist. % | grams | % | Dist. % | grams | | | |
| | +65-mesh | 38.1 | 7.77 | 0.383 | 5.66 | 0.146 | 0.031 | 6.51 | 0.012 | 11.10 | 13.99 | 4.23 | | | |
| | 65 × 150 | 112.7 | 23.00 | 0.340 | 14.88 | 0.383 | 0.028 | 17.40 | 0.032 | 9.24 | 34.44 | 10.41 | | | |
| | 150 × 270 | 129.5 | 26.42 | 0.440 | 22.12 | 0.570 | 0.032 | 22.86 | 0.041 | 7.00 | 29.98 | 9.07 | | | |
| | −270 | 209.8 | 42.81 | 0.704 | 57.34 | 1.477 | 0.046 | 53.23 | 0.097 | 3.11 | 21.58 | 6.52 | | | |
| | Total | 490.10 | 100.00 | 0.526 | 100.00 | 2.576 | 0.037 | 100.00 | 0.181 | 6.17 | 100.00 | 30.23 | | | |
| Dissolution, % | | | | | 15.04 | | | 57.42 | | | 37.01 | | | | |
| Balance (out/in × 100) | | | | | 98.30 | | | 106.41 | | | 99.75 | | | | |
| Acid Consumption (Includes acid generated by Fe and Al precipitation) | | | | | | | | | | | | | | | lb/ton 371 |

TABLE 10

Low Pressure Leach of Fine Particle Feed
Metallurgical Data

| | | Weight | dist % | % | Ni Dist. % | grams | % | Co Dist. % | grams | % | Mg Dist. % | grams | Fe g/l | Al g/l | $H_2SO_4$ g/l |
|---|---|---|---|---|---|---|---|---|---|---|---|---|---|---|---|
| Feed | +65-mesh | 67.60 | 16.9 | 0.619 | 16.51 | 0.418 | 0.083 | 15.36 | 0.056 | 10.90 | 17.86 | 7.37 | | | |
| Solids | 65 × 150 | 169.60 | 42.4 | 0.597 | 39.94 | 1.013 | 0.090 | 41.79 | 0.153 | 11.00 | 45.23 | 18.66 | | | |
| +325 | 150 × 270 | 143.60 | 35.9 | 0.662 | 37.50 | 0.951 | 0.096 | 37.75 | 0.138 | 9.64 | 33.56 | 13.84 | | | |
| | −270 | 19.20 | 4.8 | 0.799 | 6.05 | 0.153 | 0.097 | 5.10 | 0.019 | 7.19 | 3.35 | 1.38 | | | |
| | Total | 400 | 100.00 | 0.634 | 100.00 | 2.535 | 0.091 | 100.00 | 0.365 | 10.31 | 100.00 | 41.25 | | | |
| Atmos. Residue −200 | Weight | 30.0 | | 0.53 | | 0.16 | 0.04 | | 0.01 | 4.69 | | 1.41 | | | |
| Evaporate Volume | | 1000 mls | | | 5.92 g/l | | | .71 g/l | | | 45.9 g/l | | 21.3 | 4.97 | 15 |
| Filtrate Volume | | 835 mls | | | 6.67 g/l | | | 1.02 g/l | | | 64.3 g/l | | 1.72 | .73 | 1.4 |

TABLE 10-continued

| | | | Low Pressure Leach of Fine Particle Feed Metallurgical Data | | | | | | | | | | |
|---|---|---|---|---|---|---|---|---|---|---|---|---|---|
| | | | Ni | | | Co | | | Mg | | Fe | Al | H$_2$SO$_4$ |
| Wash Volume | | 972 mls | .49 g/l | | | .016 g/l | | | 4.2 g/l | | | | 0.09 |
| Residue | Weight | dist % | % | Dist. % | grams | % | Dist. % | grams | % | Dist. % | grams | | |
| | +65-mesh | 34.2 | 7.94 | 0.335 | 5.60 | 0.115 | 0.022 | 5.61 | 0.008 | 11.00 | 14.61 | 3.76 | |
| | 65 × 150 | 97.7 | 22.68 | 0.334 | 15.95 | 0.326 | 0.023 | 16.76 | 0.022 | 8.38 | 31.79 | 8.19 | |
| | 150 × 270 | 104.4 | 24.23 | 0.391 | 19.96 | 0.408 | 0.027 | 21.03 | 0.028 | 6.96 | 28.22 | 7.27 | |
| | −270 | 194.5 | 45.15 | 0.615 | 58.49 | 1.196 | 0.039 | 56.59 | 0.076 | 3.36 | 25.38 | 6.54 | |
| | Total | 430.80 | 100.00 | 0.475 | 100.00 | 2.045 | 0.031 | 100.00 | 0.134 | 5.98 | 100.00 | 25.75 | |
| Dissolution, % | | | 24.07 | | | 64.58 | | | 39.63 | | | | |
| Balance (out/in × 100) | | | 93.93 | | | 91.99 | | | 94.32 | | | | |
| Acid Consumption (Includes acid generated by Fe and Al precipitation) | | | | | | | | | | | | | lb/ton 398 |

Although the foregoing invention has been described in some detail by way of illustration and example for purposes of clarity of understanding, it will be obvious that certain changes and modifications may be practiced within the scope of the invention, as limited only by the scope of the appended claims.

What is claimed is:

1. A method of extracting nickel and cobalt from nickel; cobalt and magnesium-containing laterite ore comprising classifying said ore into a coarse, magnesium-rich fraction and a less coarse cobalt- and nickel-rich fraction, solubilizing said nickel and cobalt from said less coarse fraction into a pregnant liquor by a primary high pressure acid leach at a temperature of from about 200° C. to about 300° C., neutralizing said pregnant liquor and recovering said nickel and cobalt from said neutralized liquor, the improvement comprising leaching said coarse, magnesium-rich fraction at a temperature of below about 200° C. to liberate magnesium-depleted, nickel- and cobalt-enriched fines, separating said fines from the remainder of said coarse fraction and advancing said fines to said high pressure leach.

2. The improvement according to claim 1 wherein said acid leach solution comprises sulfuric acid.

3. A method according to claim 2 wherein said leach solution further contains at least one species selected from the group consisting of Fe, Al, Ni, Mg and Co.

4. A method according to claim 1 wherein said separating is by cycloning.

5. A method according to claim 1 wherein 90 percent of said fines are no larger in size than about 100 mesh.

6. The improvement according to claim 1 wherein said coarse, magnesium-rich fraction is leached at a pressure of from atmospheric to about 300 psig.

7. A method according to claim 6 wherein said pressure is atmospheric and said temperature is below 80° C.

8. A method according to claim 7 wherein said temperature is about 60° C.

9. A method according to claim 7 wherein said temperature is ambient.

10. A method according to claim 1 wherein about 90 percent of said fines fraction comprises about −200 mesh size fines.

11. A method according to claim 1 wherein about 90 percent of said fines fraction comprises from about −100 to about −200 mesh size fines.

* * * * *